(12) United States Patent
Dosch

(10) Patent No.: US 6,587,698 B1
(45) Date of Patent: Jul. 1, 2003

(54) PLUG-IN COMMUNICATION CARD

(75) Inventor: Franz Dosch, Rosenheim (DE)

(73) Assignee: Dosch & Amand & Co. KG, Munich (DE)

( * ) Notice: Subject to any disclaimer, the term of this patent is extended or adjusted under 35 U.S.C. 154(b) by 0 days.

(21) Appl. No.: 09/462,108

(22) PCT Filed: Jul. 3, 1998

(86) PCT No.: PCT/EP98/04133

§ 371 (c)(1),
(2), (4) Date: Apr. 17, 2000

(87) PCT Pub. No.: WO99/02002

PCT Pub. Date: Jan. 14, 1999

(30) Foreign Application Priority Data

Jul. 3, 1997 (DE) .......................................... 297 11 698

(51) Int. Cl.[7] .............................. H04B 1/38; H01Q 1/06
(52) U.S. Cl. ........................ 455/558; 455/550; 455/566; 343/721
(58) Field of Search .......................... 455/90, 422, 550, 455/556, 557, 558, 566, 575; 340/7.54, 7.55, 7.63; 235/472.01, 472.02; 343/720, 721, 732

(56) References Cited

U.S. PATENT DOCUMENTS

| | | | | |
|---|---|---|---|---|
| 5,345,367 A | | 9/1994 | Pierce et al. .................. 362/32 |
| 5,799,240 A | * | 8/1998 | Miyashita ..................... 455/90 |
| 5,991,864 A | * | 11/1999 | Kinney et al. .............. 455/575 |
| 6,181,284 B1 | * | 1/2001 | Madsen et al. ............. 455/557 |
| 6,208,876 B1 | * | 3/2001 | Raussi et al. ............... 455/557 |

FOREIGN PATENT DOCUMENTS

| | | | | |
|---|---|---|---|---|
| EP | 0500 331 A1 | 2/1992 | ............ H05K/5/02 |
| WO | WO 95/34958 | 12/1995 | ............ H04B/1/38 |

* cited by examiner

*Primary Examiner*—Nay Maung
(74) *Attorney, Agent, or Firm*—Michael Best & Friedrich LLP

(57) ABSTRACT

A plug-in communication card including a body (1), a transmit and receive means (4), an antenna (6 or 16) for radio communication, and a displays means for displaying an operating state. The antenna projects at least partially beyond the body (1) of the card, and the operating state includes at least one of a base station identified/not identified state and aE data transmission active/not active state. The display means is integrated in a component together with the antenna. The component is implemented simultaneously as a handle for the plug-in communication card for removing the card from a device into which it is inserted. The display means also causes an illumination along a contour of the antenna.

24 Claims, 3 Drawing Sheets

PLUG-IN COMMUNICATION CARD

BACKGROUND OF THE INVENTION

The present invention refers to a plug-in communication card, preferably a PCMCIA card, which is adapted to be used for radio communication. In particular, the present invention refers to a card of this type which is suitable for communication in the DECT standard.

In the prior art, PCMCIA radio adapters are known which permit a wireless connection of a computer to a network. These known radio adapters consist essentially of two units, viz. the actual PCMCIA card and an external radio module which is connected via a cable to the PCMCIA card inserted in the computer means. In addition PCMCIA cards are known, which are provided with a rod antenna integrated in the card for the purpose of radio communication.

SUMMARY OF THE INVENTION

It is the object of the present invention, to provide a plug-in communication card which, with little hardware expenditure, permits a radio communication that is easy to carry out and easy to supervise, and which is particularly suitable for radio communication of portable computers, such as laptops, in the DECT standard.

This object is achieved by the subject matter of claim 1.

Preferred embodiments of the present invention are the subject matter of the subclaims.

In the following, preferred embodiments of the plug-in communication card according to the present invention will be explained in detail making reference to the drawings enclosed, said drawings showing in detail:

DETAILED DESCRIPTION OF THE INVENTION

Figure 1:
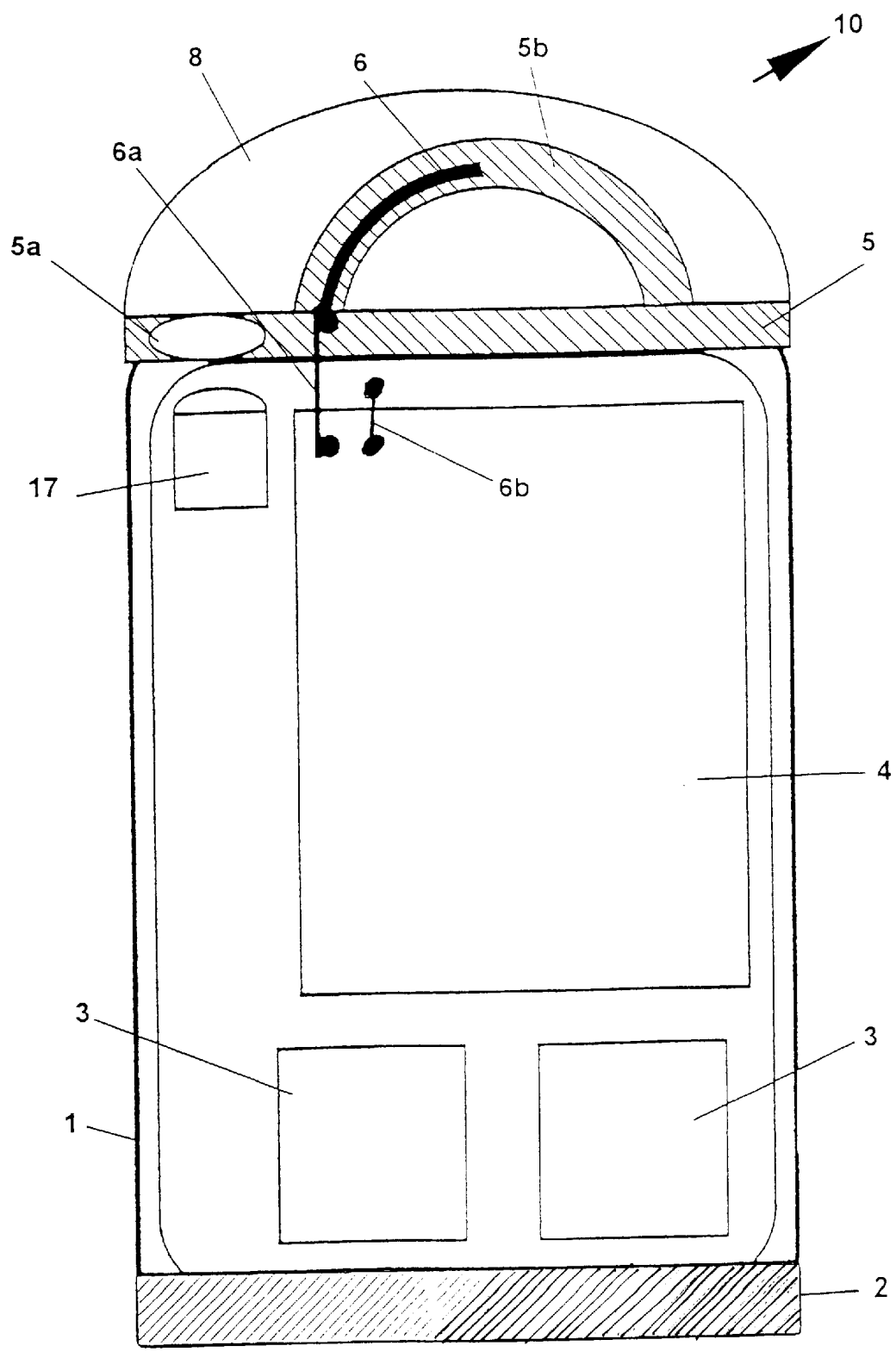
FIG. 1 a schematic representation of a plug-in communication card according to the present invention used for radio transmission in the DECT standard and comprising an operating state display, an arcuate antenna and a diffuser, the antenna and the diffuser defining a handle, FIG. 2 a schematic representation of a plug-in communication card according to the present invention used for radio transmission preferably in the DECT standard and comprising an operating state display and an arcuate antenna which is integrated in a non-symmetrical handle serving as a diffuser for the operating state display, FIG. 3 a schematic representation of a plug-in communication card according to the present invention comprising an operating state display and a frame antenna, the card housing defining part of said frame antenna.

In the following, the present invention will first be explained on the basis of the preferred embodiment shown in FIG. 1. FIG. 1 shows a plug-in communication card 1 comprising, in addition to the circuits 3 which are normally provided in the case of plug-in communication cards, a transmit-receive module 4, an antenna 6 as well as a display means defined substantially by a light-emitting diode 17 and a diffuser 8. The transmit-receive module 4 permits together with the antenna 6 radio communication between the electric device into which the card is inserted and to which it is connected via the multipoint connector 2 and a remote point. The card according to the present invention is especially used for permitting radio communication of portable computers, in particular laptops, at base stations of a DECT telephone system. Accordingly, the antenna and the circuits used are preferably designed for frequencies in the range of from 1880 to 1900 MHz. The above-mentioned display means informs the user about the current radio status. The display means can in particular be of such a nature that it displays the setting up of a communication with an identified base station. Alternatively or additionally, the display means may serve to display an active data transmission.

As can additionally be seen in FIG. 1, the light produced by the light-emitting diode 17 is coupled into a transparent diffuser 8 via an opening 5a of an end strip 5 of the plug-in communication card 1, whereby the diffuser 8 as a whole is illuminated. The card 1, which is inserted into the housing of a laptop approximately up to the end strip 5, is therefore able to impart via the projecting part 8 of the display means information about the radio path to a user operating the laptop. The antenna 6, which projects beyond the card body 1 and, consequently, beyond the laptop, also permits an undisturbed radio communication with the identified base station. Hence, the present invention precisely avoids the necessity of using an additional external radio adapter for setting up a radio communication; the radio communication is set up by components of the plug-in communication card itself. Preferably, the part formed by the antenna 6 and the diffuser 8 and projecting beyond the actual card body serves simultaneously as a handle by means of which the plug-in communication card can easily be inserted into and removed from the respective laptop.

The antenna shown in FIG. 1 can be technically characterized as an arcuate antenna in front of a conductive surface. When implemented as a quarter-wave antenna, the antenna 6 will have an effective length of approx. 4 cm for a use of the card in the DECT standard.

Figure 2:
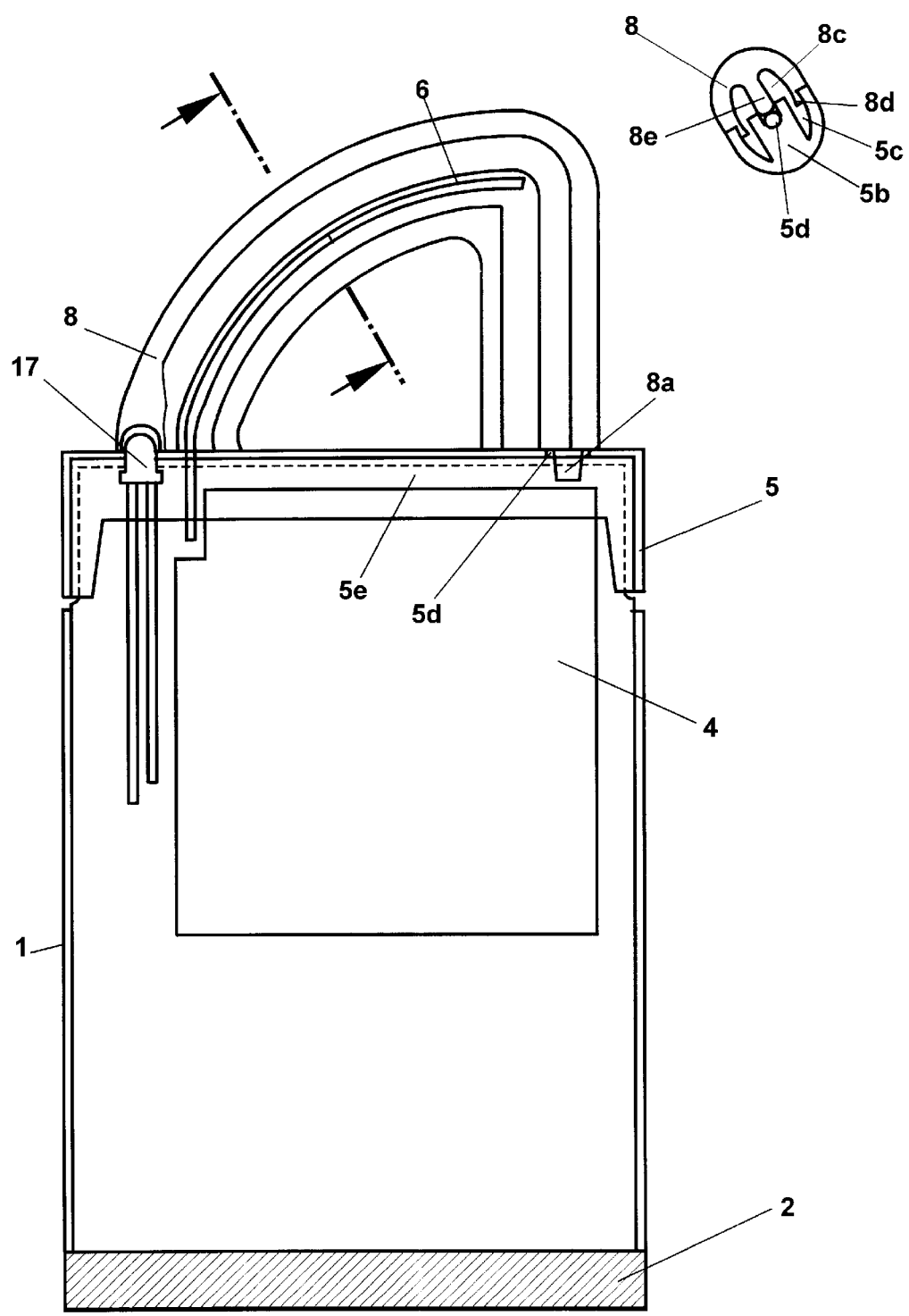

Alternatively to the embodiment provided with a curved antenna which is shown in FIG. 1, also embodiments according to FIG. 2 can be chosen. FIG. 2 shows an embodiment in the case of which the part projecting beyond the card body 1 has approximately the shape of the upper part of the letter "D" and the antenna is preferably accommodated in the correspondingly curved part. In view of the non-symmetric arrangement and the curved shape of the antenna, a directional effect is obtained approximately in the direction of the arrow 10 shown in the figure. The directional effect can be utilized for optimizing the quality of the radio path to the base station. However, in most cases the directional effect of the antenna will presumably be unwanted, since the user is then forced to use the plug-in communication card and, consequently, the laptop in a specific preferential direction.

In the case of the two embodiments shown in FIGS. 1 and 2, the ground of the radio module 4 can be connected via a wire 6b to an electrically conductive shield of the card housing. The respective shield defines a conductive plane for the antenna.

Figure 3:
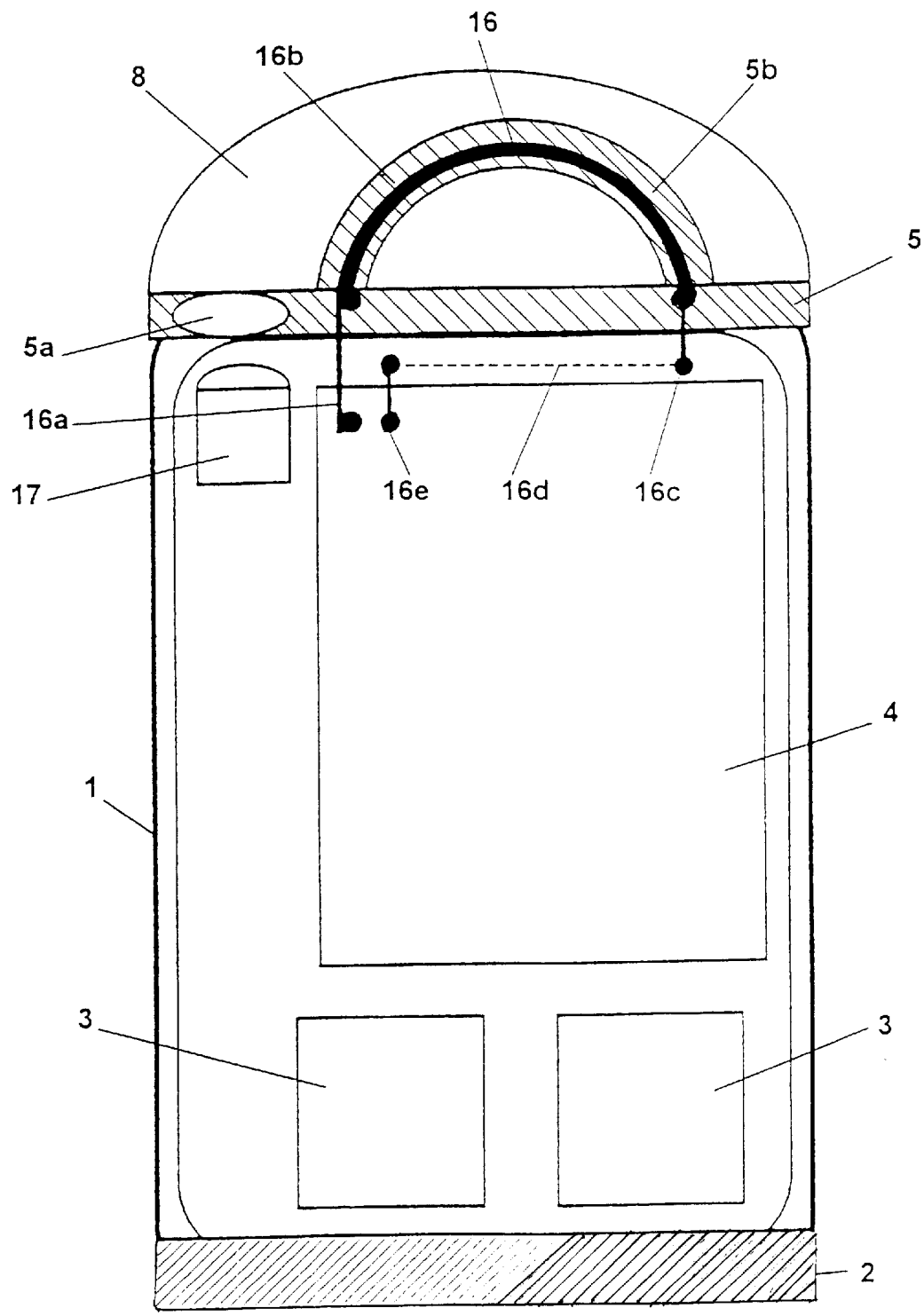

The directional characteristic of a quarter-wave rod antenna, which extends at right angles to a conductive surface, has its maximum sensitivity in the conductive plane and its minimum sensitivity at right angles to said conductive plane, i.e. in the direction of the rod antenna. The important point is apparently not that a maximum of the directional characteristic is necessarily directed towards the base station. What has to be avoided under any circumstances is that a zero of the directional characteristic is directed towards the base station. If the plug-in communication card is operated horizontally, as is normally the case, also the two zeros lie in the horizontal direction. If radio communication is to be carried out preferably in one plane, i.e. on one floor, by way of example, the danger exists that the two directional characteristic zeros of the rod antenna prevent radio communication. An elegant approach to a solution of this problem is to be seen in the use of a frame antenna 16, which is shown in FIG. 3 by way of example. The frame antenna radiates preferably in the plane of the frame and has directional characteristic zeros only in an orthogonal orientation with respect to the plane of the frame. The frame antenna consists of a conductor loop, which, as can be seen in FIG. 3, is defined by a wire jumper 16a, the antenna bow 16b, a wire jumper 16c, an electric path 16d in the shield of the plug-in communication card and a wire jumper 16e.

A feature which is common to all three embodiments shown is that the antenna projects at least partly, preferably substantially, beyond the actual card body 1 and that a display means is provided, which enables the user to read the displayed operating state of the inserted card in a simple manner.

In the case of the embodiments according to FIG. 1 and 3, the metal body forming the antenna is preferably covered by an insulating layer 5b. When this kind of solution is employed, this specially used insulating layer could also be implemented as a transparent layer and the light generated by the light source used could be transmitted into said insulating layer which will then act as a diffuser. It follows that, in the case of this kind of embodiment, it would not be necessary to use an additionally attached diffuser 8.

In FIGS. 1 to 3, the display means is always formed by a combination of a light source 17, preferably a light-emitting diode, and a diffuser 8. The diffuser is, however, not absolutely necessary if the light source projects slightly above the housing of the plug-in communication card or if a small solid angle from which the display means can be observed is considered sufficient. The diffuser 8 consists preferably of acrylic glass having defined diffusing properties for light. In this way, the light of the light-emitting diode 17 is deflected and diffused over a large solid angle. Since plug-in communication cards are preferably inserted laterally into a laptop and since the diffuser projects beyond the laptop, the user of the laptop can discern the operating state of the radio path to the base station at any time at his normal working position from which he views the screen of the laptop.

The operating state displayed preferably comprises at least the information whether the plug-in communication card has power supplied thereto. In addition, it is preferably displayed by different colours whether the plug-in communication card is in radio communication with a base station. For example, the information "radio communication exists" is indicated by a green colour and the information "radio communication does not exist" is indicated by a red colour.

The radio module 4 is preferably provided with means which permit the radio path quality to be determined. The field strength with which the base station reaches the antenna of the plug-in communication card or the bit error rate in data transmission can, for example, be used as a criterion of the radio path quality. Also the radio path quality is preferably displayed in the operating state display. The display can e.g. be brighter when the radio communication is good than when the radio communication is bad. Alternatively, the radio path quality could also be represented by different pulse duty ratios. When the transmit-receive means determines the radio path quality, the operating state display is, of course, not the only possibility of displaying said radio path quality, but this information can also be made available to the laptop connected to said display and then be displayed on the screen of the laptop.

In the embodiments according to FIGS. 1 and 2, the plug-in communication card and the laptop in which the plug-in communication card is inserted should be directed towards the base station for optimizing the radio path. When the card is additionally equipped with a hinge means about which the antenna can be rotated relative to the card, a rotation of the antenna about the respective hinge means will suffice for this purpose.

The handle shown on FIG. 2 and defined by the antenna and the diffuser is bipartite. The inner part 5e of the antenna handle is defined by an injection moulded part provided with the end strip 5. The outer part of the antenna handle is defined by the diffuser 8. The antenna 6 is enclosed between the inner part 5e and the outer part 8. In order to guarantee a simple assembly, the diffuser 8 is provided with barbs 8a which engage openings 5d in the end strip. The barbs 8a and the openings 5d are preferably provided on both sides of the plug-in communication card and at both ends of the diffuser 8, i.e. especially also in the vicinity of the light-emitting diode 17. In FIG. 2, barbs are, however, not shown in the vicinity of the light-emitting diode to make FIG. 2 clearer.

The inner part of the antenna handle 5e and the diffuser 8 are preferably not made of solid material, but they are provided with cavities 5c and 8c, respectively. The cavities 5c and 8c have the effect that material and, consequently, weight is saved. The main advantage, however, is to be seen in the fact that strongly different thicknesses of materials of the injection moulded parts 8 and 5 are avoided. The thicknesses of the materials in the area of the end strip 5 and of the barbs 8a are approx. 0.5 to 1.0 mm, whereas the thickness of the antenna handle is 8 mm, i.e. the antenna handle is approximately 10 times as thick. A largely constant thickness of injection moulded parts prevents undesired cavities (bubbles) and strong mechanical stresses after cooling down. The stability and the dimensional accuracy of the injection moulded parts are increased in this way. Furthermore, bubbles are visible in the transparent diffuser 8 and, due their irregular shape, they may create an impression of inferior quality on the user. The cavities 5c are engaged by projections 8d so as to prevent the diffuser 8 from being displaced relative to the inner part 5e of the antenna handle. The projection 8d of the diffuser presses the antenna into the groove 5d of the inner part of the antenna handle. When the groove 5d is deeper than the antenna diameter, the groove 5d and the projection 8d can also prevent the diffuser 8 from being displaced relative to the inner part of the antenna handle 5e.

For coupling the light of the light-emitting diode 17 into the diffuser 8 as effectively as possible, said light-emitting diode projects into the diffuser 8 with its semispherical part. The diffuser is provided with a recess for the light-emitting diode 17. The end strip 5 is preferably implemented such that it is solder-resistant so that the antenna 6 can easily be connected to the radio module 4 through the wire 6a. This results in a typical wavelength of $\lambda=15.8$ cm for frequencies of 1.9 GHz of the DECT standard. For arcuate antennas projecting beyond a conductive surface a slightly shorter length than $\lambda/4$, i.e. approx. 3.5 cm, is preferably used. The plug-in communication card itself is preferably implemented as a PCMCIA card and has therefore a width of 54 mm and a length of 85.6 mm. If the PCMCIA card type III is used, the height of the plug-in communication card is 10.5 mm at the most. Hence, an antenna length of 35 mm will go well with the geometrical dimensions of the PCMCIA card.

The impedance of the transmit-receive means must be adapted to the impedance of the antenna. Transmit-receive modules have preferably an impedance of 50 Ω. A thin rod antenna in front of a conductive surface has an impedance of 40 Ω. If the antenna has a finite thickness $D_A$ and a length I, its impedance $Z_A$ can be calculated by means of the following formula:

$$Z_A = 30 \ \Omega \cdot ln\left(\frac{1.15 \cdot l}{D_A}\right)$$

When an antenna wire with a diameter of 0.8 to 1 mm is used, an antenna impedance of 47 to 44 Ω will be obtained. The arcuate shape of the antenna causes a slight further reduction of the antenna impedance. Notwithstanding this, this minor mismatch seems to be tolerable. Ideally, a variable capacitor or a combination of a variable capacitor and of a coil is, however, used for adapting the antenna impedance and the impedance of the transmit-receive module.

The embodiment in FIG. 3 is equipped with a frame antenna 16. Other than a rod antenna, which produces primarily an electric field, the frame antenna produces primarily a magnetic field. The magnetic field is generated perependicularly to the plane of the frame. The frame antenna radiates preferably into the plane of the frame. For adapting the impedance of the frame antenna to the impedance of the transmit-receive module, the frame antenna may consist of a plurality of loops. The impedance of the frame antenna is calculated according to the following formula:

$$Z_R = \frac{31000 \cdot (n^2 (A/m))^2}{(\lambda/m)^4} \ \Omega$$

wherein n is the number of windings, A is the surface enclosed by the frame antenna and is the wavelength. This formula is only applicable in cases where the lateral dimensions of the frame are small in comparison with the wavelength.

What is claimed is:

1. A plug-in communication card for connection to a device, the plug-in communication card comprising:
   a body (1);
   a transmit and receive means (4);
   an antenna (6 or 16) for radio communication, the antenna projects at least partially beyond the body (1) of the card; and
   a display means for displaying an operating state which includes at least one of a base station identified/not identified state and a data transmission active/not active state, the display means integrated in a component together with the antenna, the component implemented simultaneously as a handle for the plug-in communication card for removing the card from the device into which it is inserted, and wherein the display means causes an illumination along a contour of the antenna.

2. A plug-in communication card according to claim 1, wherein the antenna has an arcuate shape and an effective length, the effective length of the antenna being a quarter of a wavelength which governs the radio communication.

3. A plug-in communication card according to claim 2, wherein the card is shielded by a metal layer and that the metal layer defines a conductive plane for the antenna from a point of view high-frequency technology.

4. A plug-in communication card according to claim 2, further comprising means for folding, rotating or bending the antenna so as to optimize a directional effect of the antenna.

5. A plug-in communication card according to claim 1 wherein the antenna is implemented as a frame antenna (16).

6. A plug-in communication card according to claim 5, wherein the frame antenna has an arcuate shape.

7. A plug-in communication card according to claim 1, wherein the antenna (6 or 16) is coated with an insulating layer.

8. A plug-in communication card according to claim 1, wherein the display means comprises at least one of a light-emitting diode (17) and a laser diode (17).

9. A plug-in communication card according to claim 8, wherein the display means comprises a deflection means (8) for deflecting light generated by the at least one of the light-emitting diode and the laser diode.

10. A plug-in communication card according to claim 9, wherein in an inserted condition of the card and when a user is sitting normally, the display means can only be viewed via the deflection means (8).

11. A plug-in communication card according to claim 9, wherein the deflection means is formed by an electric insulation covering the antenna.

12. A plug-in communication card according to claim 9, wherein the deflection means (8) is transparent and scatters the light in a defined manner.

13. A plug-in communication card according to claim 9, wherein a cross-section of the deflecting means decreases as a distance from the at least one of the light-emitting diode and the laser diode increases so as to support a uniform radiation of light coupled into the deflection means.

14. A plug-in communication card according to claim 8, wherein the light-emitting diode (17) has a semispherical head, and projects beyond the card body and into the deflection means.

15. A plug-in communication card according to claim 1, wherein a shape of the handle corresponds approximately to one of a shape of a upper half of a letter "D" and a shape of a letter "C".

16. A plug-in communication card according to claim 15, wherein the antenna (6) is provided in a bent portion of a D-shaped handle.

17. A plug-in communication card according to claim 1, wherein the handle includes an inner part (5b) and an outer part, the inner part being fixedly connected to the body of the card and the outer part of the handle being attached to the inner part in a caplike manner, and the antenna (6) being located between the inner part and the outer part.

18. A plug-in communication card according to claim 17, wherein the outer part of the handle is transparent and defines the deflection means (8).

19. A plug-in communication card according to claim 17, wherein the outer part of the handle is transparent and is provided with hooks engaging complementary recesses in the inner part when the outer part is attached to the inner part.

20. A plug-in communication card according to claim 1, further comprising means for adapting an impedance of the antenna to an impedance of the transmit and receive means.

21. A plug-in communication card according to claim 1, wherein the display means is implemented such that at least one of the base station identified/not identified state and the data transmission active/not active state can be represented by at least one of different colors and different flashing sequences.

22. A plug-in communication card according to claim 1, wherein the plug-in communication card is provided with a means for detecting a radio path quality, the radio path quality being characterized by at least one of a field strength of a base station at a location of the plug-in communication card and a bit error rate.

23. A plug-in communication card according to claim 22, wherein also the radio path quality is displayed as an operating state.

24. A plug-in communication card according to claim 22, wherein the plug-in communication card is capable of transmitting a detected radio path quality to the device into which it has been inserted.

* * * * *